(12) United States Patent
Ghosh et al.

(10) Patent No.: US 8,552,132 B2
(45) Date of Patent: Oct. 8, 2013

(54) RHEOLOGY MODIFIERS FOR MODIFYING THE RHEOLOGICAL BEHAVIOUR OF COATING COMPOSITIONS

(75) Inventors: Tamal Ghosh, Hopewell Junction, NY (US); Malcolm Skinner, Bradford (GB); Tiina Luttikhedde, Markelo (NL); Céline Hossenlopp, Mulhouse (FR); Laurent Brauge, Ribécourt-Dreslincourt (FR)

(73) Assignee: BASF SE, Ludwigshafen (DE)

( * ) Notice: Subject to any disclaimer, the term of this patent is extended or adjusted under 35 U.S.C. 154(b) by 1085 days.

(21) Appl. No.: 11/991,758

(22) PCT Filed: Sep. 4, 2006

(86) PCT No.: PCT/EP2006/065951
§ 371 (c)(1),
(2), (4) Date: Aug. 11, 2009

(87) PCT Pub. No.: WO2007/031419
PCT Pub. Date: Mar. 22, 2007

(65) Prior Publication Data
US 2009/0298996 A1     Dec. 3, 2009

(30) Foreign Application Priority Data

Sep. 14, 2005   (EP) .................................. 05108440
Jul. 25, 2006   (EP) .................................. 06117808

(51) Int. Cl.
C08F 20/00        (2006.01)
C08F 22/38        (2006.01)

(52) U.S. Cl.
USPC ........ 526/303.1; 524/555; 526/240; 526/260; 526/307.3; 526/307.6; 526/307.7

(58) Field of Classification Search
USPC ......... 524/555; 526/240, 303.1, 307.6, 307.7, 526/260, 307.3
See application file for complete search history.

(56) References Cited

U.S. PATENT DOCUMENTS

| 4,395,524 | A | * | 7/1983 | Emmons et al. ............ 526/307.2 |
| 5,114,600 | A | | 5/1992 | Biggin et al. ................... 252/86 |
| 5,116,923 | A | * | 5/1992 | Bock et al. ................. 526/307.2 |
| 2004/0157981 | A1 | * | 8/2004 | Green ........................... 524/555 |
| 2004/0171715 | A1 | * | 9/2004 | Flisher et al. ................. 522/150 |

FOREIGN PATENT DOCUMENTS

| EP | 0102760 | * | 3/1984 |
| EP | 0 376 758 A2 | | 7/1990 |
| WO | 90/12862 | | 11/1990 |

* cited by examiner

*Primary Examiner* — David W Wu
*Assistant Examiner* — Marie Reddick
(74) *Attorney, Agent, or Firm* — Drinker Biddle & Reath (57) ABSTRACT

The present invention provides rheology modifiers, which are water-soluble polymers having a weight average molecular weight (Mw) of at least 1,000,000 g/mol and an intrinsic viscosity of at least 2.5 dl/g, both as determined by size exclusion chromatography, and wherein the water-soluble polymers are in the form of solid particles. It also provides mixtures of rheology modifiers comprising a first rheology modifier, which is a water-soluble polymer having a weight average molecular weight (Mw) of at least 1,000,000 g/mol and an intrinsic viscosity of at least 2.5 dl/g, both as determined by size exclusion chromatography, and a second rheology modifier, which has a weight average molecular weight of from 2,000 g/mol to 800,000 g/mol. It also provides coating composition containing the rheology modifiers, respectively, mixtures of rheology modifiers, a process for their preparation, a process for coating a substrate using these coating compositions and substrates coated with these coating compositions.

3 Claims, 3 Drawing Sheets

RHEOLOGY MODIFIERS FOR MODIFYING THE RHEOLOGICAL BEHAVIOUR OF COATING COMPOSITIONS

CROSS REFERENCE TO RELATED APPLICATIONS

This application is a §371 National Stage Application of PCT International Application No. PCT/EP2006/065951, filed Sep. 4, 2006, and claims priority under 35 U.S.C. §119 and/or §365 of European Application No. 05108440.8 filed Sep. 14, 2005 and European Application No. 06117808.3 filed Jul. 25, 2006.

BACKGROUND

The present invention refers to rheology modifiers and to mixtures of rheology modifiers for modifying the rheological behaviour of coating compositions, to coating compositions containing these rheology modifiers and to substrates coated with these coating compositions. It also refers to processes for the preparation of the rheology modifiers and the coating compositions and to processes for coating the substrates.

Coating compositions for coating a substrate usually include a rheology modifier in order to adapt the rheological behaviour of the coating color (synonymous to coating composition) to the coating device and coating conditions. Traditional coating techniques such as blade coating and roll coating require coating compositions of relatively high "low shear viscosity" (synonymous to Brookfield viscosity) and low "apparent high shear viscosity". Curtain coating, a relatively recent coating technique, involves adding the coating composition as a falling thin curtain onto the substrate. This method requires coating compositions of relatively low "low shear viscosity", but high "apparent extensional viscosity" (synonymous to high strechability), as the coating composition curtain should not break especially when the substrate moves at high speed.

Rheology modifiers are usually polymers. Whereas many rheology modifiers, which in a coating composition exhibit high "low shear viscosity" and low "apparent high shear viscosity", and thus are suitable for traditional coating techniques, are known, rheology modifiers, which as aqueous solution exhibit high "apparent extensional viscosity" and are thus suitable for curtain coating, are rare.

One rheology modifier, that is commercially available and is capable of providing aqueous solutions of high "apparent extensional viscosities", is STEROCOLL® BL (BASF, acrylamide/acrylic acid copolymers having a Mw of about 10,000,000). The disadvantage of this rheology modifier is that it is only obtainable as an inverse (water-in-oil) emulsion. Inverse emulsions are unstable as the phases can easily separate and prone to freezing, which can cause the formation of undissolved gel particles. Therefore, inverse emulsions require additional equipment such as mixing or heating devices when stored, transported or added into the coating composition and thus are difficult to handle. In addition, inverse emulsions generate oil waste, and thus for environmental reasons demand a special clean-up after use.

It is a first object of the present invention to provide a rheology modifier for coating compositions, which is capable of providing aqueous solutions of high "apparent extensional viscosities", and which is easy to handle and does not cause environmental problems.

This object is solved by the rheology modifiers discussed herein.

In some coating processes for preparing coated paper, which include blade coating operations, coating compositions of a higher than usual low "apparent high shear viscosity" are required. Coating compositions having a high amount of polyvinyl alcohol as co-binder are known to fulfill this requirement. However, when waste paper coated with these compositions is recycled, a paper stock containing sticky material of light colour, so-called "white pitch", is obtained resulting in "white pitch" throughout the paper machine and in low-quality paper. As a consequence, the machine has to be stopped and cleaned, and in order to avoid further formation of "white pitch" an increased demand of chemicals, for example fixatives, in the wet end is needed.

In some cases, the formation of "white pitch" is related to the presence of polyvinyl alcohol in the paper stock as discussed in Teirfolk, J.-E, Hossenlopp, C., Castaing, J.-C., "Interactions between latex, calcium ions and polyvinyl alcohol", PTS-Streicherei-Symposium, 2001.

Therefore, it is a second object of the present invention to provide a rheology modifier for coating compositions, which is capable of forming coating compositions of higher than usual low "apparent high shear viscosity" without requiring the presence of high amounts of polyvinyl alcohol as co-binder.

This object is solved by the mixture of rheology modifiers described herein.

The rheology modifiers of the first aspect of present invention are water-soluble polymers having a weight average molecular weight (Mw) of at least 1,000,000 g/mol and an intrinsic viscosity of at least 2.5 dl/g, both as determined by size exclusion chromatography, and the rheology modifiers are in the form of solid particles.

Preferably, the polymers have a weight average molecular weight (Mw) of at least 2,000,000 g/mol and an intrinsic viscosity of at least 3.5 dl/g, both as determined by size exclusion chromatography. More preferably, the polymers have a weight average molecular weight (Mw) of at least 2,500,000 g/mol and an intrinsic viscosity of at least 4.5 dl/g, both as determined by size exclusion chromatography.

DETAILED DESCRIPTION

Preferably, the solid particles are beads. Preferably, the beads have a diameter in the range of 1 to 1000 μM, more preferably, of 100 to 400 μm.

Water-soluble means that at least 1 g of polymer dissolves in 100 g water to form a viscous solution.

Preferably, the polymers are composed of monomer units derived from (i) at least one monomer of formula I whereby $R^1$ and $R^2$ can be the same or different and are hydrogen, $C_{1-6}$-alkyl or $C_{5-8}$-cycloalkyl, or $R^1$ and $R^2$ can together with the nitrogen to which they are attached form a hetero-cyclic 5- or 6-membered ring, whereby $C_{1-6}$-alkyl may be substituted with amino, hydroxyl, halogen, $C_{1-4}$-alkoxy, aryl or mono- or $diC_{1-4}$-alkylamino, and $R^3$ and $R^4$ can be the same or different and are hydrogen, $C_{1-8}$-alkyl, $C_{5-8}$-cycloalkyl, halogen, aryl or $NHCOC_{1-4}$-alkyl, whereby $C_{1-6}$-alkyl may be substituted with amino, hydroxyl, halogen, $C_{1-4}$-alkoxy, aryl or mono- or $diC_{1-4}$-alkylamino, and (ii) optional other ethylenically unsaturated monomers.

Examples of $C_{1-6}$-alkyl are methyl, ethyl, propyl, isopropyl, butyl, sec-butyl, tert-butyl, isobutyl, pentyl and hexyl. Examples of $C_{5-8}$-cycloalkyl are cyclopentyl, cyclohexyl and cycloheptyl. Examples of 5- or 7-membered heterocyclic rings are morpholino, pyrrolidino and piperidino. Examples of aryl are phenyl and substituted phenyl such as tolyl. Examples of halogen are bromine and chlorine. Examples of $C_{1-4}$-alkoxy are methoxy, ethoxy, propoxy, isopropoxy, butoxy, sec-butoxy, tert-butoxy and isobutoxy. Examples of mono- or $diC_{1-4}$-alkylamino are N-methylamino, N,N-ethylmethylamino, N,N-diethylamino, N,N-dipropylamino, N-isopropylamino and N,N-dibutylamino.

Examples of monomers of formula (I) are (meth)acrylamide, N,N-dimethyl(meth)acrylamide, N,N-diethyl(meth)acrylamide, N-isopropyl(meth)acrylamide.

Preferably, $R^1$ and $R^2$ can be the same or different and are hydrogen or $C_{1-4}$-alkyl, whereby $C_{1-4}$-alkyl may be substituted with amino or mono- or $diC_{1-4}$-alkylamino, and $R^3$ and $R^4$ can be the same or different and are hydrogen, $C_{1-4}$-alkyl or $NHCOC_{1-4}$-alkyl, whereby $C_{1-4}$-alkyl may be substituted with amino or mono- or $diC_{1-4}$-alkylamino.

Examples of $C_{1-4}$-alkyl are methyl, ethyl, propyl, isopropyl, butyl, sec-butyl, tert-butyl, and isobutyl.

More preferably, $R^1$ and $R^2$ can be the same or different and are hydrogen or $C_{1-4}$-alkyl, and $R^3$ and $R^4$ can be the same or different and are hydrogen or $C_{1-4}$-alkyl.

Even more preferably, $R^1$ and $R^2$ are hydrogen, and $R^3$ and $R^4$ are the same or different and are hydrogen or $C_{1-4}$-alkyl.

Most preferably, $R^1$, $R^2$, $R^3$ and $R^4$ are hydrogen.

Any suitable other ethylenically unsaturated monomer can be used. Examples of other ethylenically unsaturated monomers are acrylic monomers, styrene monomers, vinyl monomers, maleic monomers and allyl monomers.

Examples of acrylic monomers are (meth)acrylic acid or salts thereof, (meth)acrylamide, (meth)acrylonitrile, $C_{1-6}$-alkyl (meth)acrylates such as ethyl (meth)acrylate, butyl (meth)acrylate or hexyl (meth)acrylate, 2-ethylhexyl (meth) acrylate, (meth)acrylates such as dimethylaminoethyl acrylate or diethylaminoethyl acrylate, amides formed from $di(C_{1-4}$-alkylamino$)C_{1-6}$-alkylamines and (meth)acrylic acid and $C_{1-4}$-alkyl halide adducts thereof.

Examples of styrene monomers are styrene, 4-methylstyrene and 4-vinylbiphenyl. Examples of vinyl monomers are vinyl alcohol, vinyl chloride, vinylidene chloride, vinyl isobutyl ether and vinyl acetate. Examples of olefin monomers are ethylene, propylene, butadiene and isoprene and chlorinated or fluorinated derivatives thereof such as tetrafluoroethylene. Examples of maleic monomers are maleic acid, maleic anhydride and maleimide. An example of an allyl monomer is diallyldimethylammonium chloride.

Preferably, the optional other ethylenically unsaturated monomers comprise at least one monomer of formula II whereby $R^5$ and $R^6$ can be the same or different and are hydrogen, $C_{1-6}$-alkyl, $C_{5-8}$-cycloalkyl, halogen, aryl or $NHCOC_{1-4}$-alkyl, whereby $C_{1-6}$-alkyl may be substituted with amino, hydroxyl, halogen, $C_{1-4}$-alkoxy, aryl or mono- or $diC_{1-4}$-alkylamino, and M is hydrogen, ammonium, mono-, di-, tri- or $tetraC_{1-4}$-alkylammonium, alkali metal or earth alkaline metal.

Examples of mono-, di-, tri- or $tetraC_{1-4}$-alkylammonium are N-ethylammonium, N,N-diethyl-ammonium and N,N,N-tributylammonium. Examples of alkali metals are sodium, potassium and lithium. Examples of earth alkaline metals are magnesium and calcium.

Examples of monomers of formula (II) are (meth)acrylic acid, ammonium (meth)acrylate, sodium (meth)acrylate.

Preferably, $R^5$ and $R^6$ can be the same or different and are hydrogen, $C_{1-4}$-alkyl or $NHCOC_{1-4}$-alkyl, and M is hydrogen, ammonium, mono-, di-, tri- or $tetraC_{1-4}$-alkylammonium, alkali metal or earth alkaline metal.

More preferably, $R^5$ and $R^6$ are the same or different and are hydrogen or $C_{1-4}$-alkyl, and M is hydrogen, ammonium, or alkali metal. Most preferably, $R^5$ and $R^6$ are hydrogen, and M is hydrogen, ammonium, or alkali metal.

Preferably, the polymers are obtainable by polymerisation of at least one monomer of formula (I) and at least one monomer of formula (II).

Preferably the molar ratio of monomers of formula (I)/monomers of formula (II) is from 90:1 to 1:90, more preferably it is from 10:1 to 1:10, even more preferably, it is from 5:1 to 1:5, and most preferably it is from 1:1 to 1:5.

Also part of the first aspect of the invention is a process for preparing the rheology modifiers of the present invention, which comprises the steps of (i) preparing an aqueous solution of the monomer of formula (I) and optional other ethylenically unsaturated monomers, (ii) mixing the monomer solution with a water-immiscible solvent, (iii) polymerizing the monomers in the presence of an initiator, (iv) removing water by distillation to form solid polymer particles, and (v) separating the solid polymer particles from the reaction mixture.

It is possible to start the distillation of water already during step (iii).

Examples of water-immiscible solvent are mineral oils or hydrocarbon liquids such as EXXSOL™ D40 FLUID (EXXONMOBIL®, light hydrotreated petroleum distillates), or ISOPAR™ G (EXXONMOBIL®, isoparaffinic hydrocarbons), hydrophobic carboxylic acid esters such as dibutyl phthalate or dioctyl phthalate, fatty acid triglycerides such as soyabean oil or sunflower oil, and silicone oils.

Preferably, the water-immiscible solvent is a mineral oil or hydrocarbon liquid.

The initiator can be a peroxide, a persulfate, an azo compound, a redox couple or mixtures thereof.

Examples of peroxides are hydrogen peroxide, potassium peroxide, tert-butyl peroxide, tert-butyl hydroperoxide, cumene hydroperoxide and benzoyl peroxide. Examples of per-sulfates are ammonium, sodium or potassium persulfate. Examples of azo compounds are 2,2-azobisisobutyronitrile, 4,4'-azobis(4-cyanovaleric acid) and 2,2'-azobis(N,N'-dimethyl-eneisobutyramidine) dihydrochloride, 1,1'-azobis(cyclohexanecarbonitrile) and 2,2'-azo-bis(2-amidinopropane) dihydrochloride. Redox couples consist of an oxidizing agent and a reducing agent. The oxidizing agent can be one of the above listed peroxides, persulfates, sulfates or azo compounds, or an alkali metal chlorate or bromate. Examples of reducing agents are ascorbic acid, glucose or ammonium or alkali metal hydrogen sulfite, sulfite, thiosulfate or sulfide, or ferrous ammonium sulfate.

Preferably, the initiator is a mixture of a redox couple and one or more initiators selected from the group consisting of peroxides, persulfates and azo compounds.

More preferably, the initiator is a mixture of a redox couple, wherein the oxidizing agent is selected from the group consisting of peroxides and alkali metal bromates, and the reducing agent is selected from the group consisting of ammonium or alkali metal hydrogen sulfite, sulfite, thiosulfate or sulfide, or ferrous ammonium sulfate, with one or more azo compound initiators.

Even more preferably, the initiator is a mixture of a redox couple, wherein the oxidizing agent is a peroxide and the reducing agent is an alkali metal hydrogen sulfite or sulfite, with one or more azo compound initiators.

Most preferably, the initiator is a mixture of a redox couple, wherein the oxidizing agent is tert-butylhydroperoxide and the reducing agent is sodium sulfite, and 2,2'-azobis(2-amidino-propane) dihydrochloride as azo compound initiator.

Preferably, the polymerization is performed in the presence of a chain transfer agent.

Examples of chain transfer agents are sodium hypophosphite, mercapto ethanol, thioglycolic acid, formic acid and malic acid. A preferred chain transfer agent is sodium hypophosphite.

Preferably, the polymerization is performed in the presence of a polymeric stabilizer and/or a sequesterant agent.

Examples of polymeric stabilizer are $C_{1-20}$-alkyl (metha) acrylate (meth)acrylic acid copolymers. Examples of $C_{1-20}$-alkyl are methyl, ethyl, propyl, butyl, pentyl, hexyl, heptyl, octyl, nonyl, decyl, undecyl, dodecyl, myristyl and stearyl. A preferred polymeric stabilizer is stearyl methacrylate:methacrylic acid copolymer.

Examples of sequesterant agents are ethylenediaminetetraacetic acid and diethylene-triaminepentaacetic acid, penta sodium salt.

Preferably, the ratio of water-immiscible solvent/water is between 10:1 and 1:10, more preferably, it is between 5:1 and 1:5, most preferably, it is between 4:1 and 1:1.

Preferably, the concentration of monomer or monomers in the aqueous phase is between 0.1 and 20 mol/L, more preferably, it is between 1 and 15 mol/L, most preferably, it is between 7 and 12 mol/L.

Preferably, the molar ratio of initiator or initiators/monomer or monomers is between 0.0001% and 1%, more preferably, it is between 0.001% and 0.1%, most preferably, it is between 0.01% and 0.05%.

Preferably, the molar ratio of chain transfer agent/monomer or monomers is between 0.001% and 10%, more preferably, it is between 0.01% and 1%, most preferably it is between 0.2% and 0.6%.

Preferably, the pH of the aqueous phase is 3 to 10, more preferably, 4 to 8, most preferably, 5 to 7.

Also part of the first aspect of the invention is a process for preparing a coating composition which comprises the steps of
(i) providing the rheology modifiers of the first aspect of the present invention,
(ii) optionally forming an aqueous solution or inverse (water-in-oil) emulsion of the rheology modifiers of the first aspect of the present invention, and
(iii) mixing the rheology modifiers of step (i) or the aqueous solution or inverse emulsion of the rheology modifiers obtained in step (ii) with a binder, a pigment, a carrier solvent and optional additives in order to form a coating composition.

Preferably, the rheology modifiers of step (i) is mixed with a binder, a pigment, a carrier solvent and optional additives in order to form a coating composition.

Any suitable binder or binder mixtures can be used. Examples of binders are styrene-butadiene (SB) copolymer, styrene-acrylate (SA) copolymer, styrene-butadiene-acrylonitrile copolymer, styrene-acrylate-acrylonitrile copolymer, styrene-butadiene-acrylate-acrylonitrile copolymer, styrene-maleic anhydride copolymer, styrene-acrylate-maleic anhydride copolymer, polysaccharides, proteins, polyvinyl pyrrolidone, polyvinyl alcohol, polyvinyl acetate, natural polymers such as starch, cellulose or protein and cellulose derivatives such as carboxymethylcellulose (CMC).

Preferred binders are styrene-butadiene (SB) copolymer, styrene-acrylate (SA) copolymer and polyvinyl alcohol and mixtures thereof.

Any suitable pigment or pigment mixture can be used. Examples of pigments are clay (or kaolin), calcined clay (or kaolin), ground calcium carbonate (GCC), precipitated calcium carbonate (PCC), titanium dioxide, satin white, zinc oxide, barium sulfate, gypsum, silica, alumina trihydrate, talc, mica and diatomaceous earth.

An example of a carrier solvent is water. The binder and/or the pigment can be employed as aqueous solutions or dispersions, e.g. the binder may be employed as latex, so that the addition of further water may not be necessary.

Examples of optional additives are optical brighteners, surfactants, dispersants, biocides, defoamers, lubricants, crosslinkers (also called insolubilisers), additional rheology modifiers, water retention agents and dyes.

An example of an optical brightener is diaminostilbenedisulfonic acid as sold for example under the tradename CIBA® TINOPAL® UP (CIBA®, diaminostilbenedisulfonic acid). An example of a surfactant is sodium dialkylsulphosuccinate as sold for example under the tradename AEROSOL® OT (CYTEC®, sodium dialkylsulphosuccinate), or alkoxylated fatty acids as sold for example under the tradename INVADINE® PF (CIBA®, alkoxylated fatty acids). Examples of dispersants are sodium salts of acrylic polymers, as sold for example under the tradename DISPEX® N40 (CIBA®, sodium salt of an acrylic polymer in water). An example of a biocide is glutaraldehyde as sold for example under the tradename PRIOR™ 850 (glutaraldehyde). Examples of defoamers are polyether derivatives of aliphatic alcohols as sold for example under the tradename AFRANIL® F (polyether derivatives of aliphatic alcohols). An example of a lubricant is calcium stearate as sold for example under the tradename CIBA® RAISACOAT® CAS50 (calcium stearate). An example of a crosslinker is ammonium zirconium carbonate as sold for example under the tradename CIBA® RAISACOAT® AZ20 (ammonium zirconium carbonate). Examples of additional rheology modifiers are xanthan gum, methylcellulose, hydroxypropyl methylcellulose, or acrylic polymers such as sold for example under the tradename CIBA® RHEOVIS® CTE 407 (acrylic polymers). An example of a water retention agent is sodium alginate. Examples of dyes are organic pigment dyes, respectively anionic direct dyes as sold for example under the tradenames CIBA® IRGALITE® (anionic direct dyes) and CIBA® PERGASOL® (anionic direct dyes).

Preferably the pH of the coating composition is in the range of 6.5 to 10.5, more preferably 7 to 10, most preferably 7.5 to 9.5.

The amount of solids in the coating composition can be 10 to 90%, preferably 20 to 80%, more preferably 30 to 70%, most preferably 50 to 70%, by weight based on the weight of the composition.

The amount of pigment can be from 1 to 90%, preferably from 20 to 80%, more preferably 30 to 70%, most preferably from 40 to 60% by weight based on the weight of the composition.

The amount of rheology modifier of the present invention can be from 0.001 to 5, preferably from 0.01 to 3, more preferably from 0.05 to 1 dry weight parts per 100 dry weight parts pigment.

The amount of binder can be from 1 to 60, preferably from 3 to 30, more preferably from 10 to 20 dry weight parts per 100 dry weight parts pigment.

The amount of optional other components can be from 0 to 10, preferably from 0.5 to 4 dry weight parts per 100 dry weight parts pigment.

Also part of the first aspect of the invention is a coating composition obtainable by above process.

Another part of the first aspect of the present invention is a process for coating a substrate comprising the steps of
(i) providing the rheology modifiers of the first aspect of the present invention,
(ii) optionally forming an aqueous solution or inverse (water-in-oil) emulsion of the rheology modifiers of the present invention,
(iii) mixing the rheology modifiers of step (i) or the aqueous solution or inverse emulsion of the rheology modifiers obtained in step (ii) with a binder, a pigment, a carrier solvent and optional additives in order to form a coating composition, and
(iv) applying the coating composition obtained in step (iii) onto the substrate.

The substrate can be a sheet or any other three dimensional object and it can have an even or uneven surface. The substrate can be made from paper, cardboard, metal, wood, textiles, glass, ceramics and/or polymers. Examples of polymers are polyethylene terephthalate, low density-polyethylene, polypropylene, biaxially orientated polypropylene, polyether sulfone, polyvinyl chloride polyester and polystyrene. Preferably, the substrate is made from paper, cardboard or polymer. More preferably, the substrate is paper.

The coating composition can be applied by any suitable method such as blade, roll, spray or curtain coating. Preferably the coating composition is applied by curtain coating coating onto the substrate.

Another part of the first aspect of the invention are substrates coated by the above process.

Also part of the first aspect of the present invention is the use of the rheology modifiers of the first aspect of the present invention for coating operations, especially for curtain coating operations.

Aqueous solutions of the rheology modifiers of the first aspect of the present invention show a high "apparent extensional viscosity" and a low "low shear viscosity" (synonymous to Brookfield viscosity) when the concentration of the rheology modifier is low and a low "apparent extensional viscosity" and a high "low shear viscosity" (synonymous to Brookfield viscosity) when the concentration of the rheology modifier is high. So, depending on the concentration, these rheology modifiers can be used for all kind of coating methods, such as blade, roll or curtain coating.

The rheology modifiers of the first aspect of the present invention have the advantages that they are solid polymer particles and thus very stable, easy to handle and do not require a special clean-up after use in order to avoid environmental problems. In addition, they can be either used as solid particles or readily dissolved in water just before use.

The mixtures of rheology modifiers of the second aspect of the present invention comprise a first rheology modifier, which is a water-soluble polymer having a weight average molecular weight (Mw) of at least 1,000,000 g/mol and an intrinsic viscosity of at least 2.5 dl/g, both as determined by size exclusion chromatography, and a second rheology modifier, which has a weight average molecular weight of from 2,000 g/mol to 800,000 g/mol, as determined by size exclusion chromatography.

Preferably, the first rheology modifier is a polymer having a weight average molecular weight (Mw) of from 1,000,000 g/mol to 2,500,000 g/mol and an intrinsic viscosity of from 2.5 to 5.0 dl/g, both as determined by size exclusion chromatography. More preferably, the first rheology modifier is a polymer having a weight average molecular weight (Mw) of from 1,000,000 g/mol to 1,500,000 g/mol, and an intrinsic viscosity of from 2.5 to 4.5 dl/g, both as determined by size exclusion chromatography.

Preferably, the first rheology modifier is a polymer composed of monomer units derived from
(i) at least one monomer of formula I (I)

whereby
$R^1$ and $R^2$ can be the same or different and are hydrogen, $C_{1-6}$-alkyl or $C_{5-8}$-cycloalkyl, or $R^1$ and $R^2$ can together with the nitrogen to which they are attached form a hetero-cyclic 5- or 6-membered ring, whereby $C_{1-6}$-alkyl may be substituted with amino, hydroxyl, halogen, $C_{1-4}$-alkoxy, aryl or mono- or di$C_{1-4}$alkylamino, and $R^3$ and $R^4$ can be the same or different and are hydrogen, $C_{1-6}$-alkyl, $C_{5-8}$-cycloalkyl, halogen, aryl or NHCOC$_{1-4}$-alkyl, whereby $C_{1-6}$-alkyl may be substituted with amino, hydroxyl, halogen, $C_{1-4}$-alkoxy, aryl or mono- or di$C_{1-4}$-alkylamino, and (ii) optional other ethylenically unsaturated monomers.

Examples of $C_{1-4}$-alkyl are methyl, ethyl, propyl, isopropyl, butyl, sec-butyl, tert-butyl, and isobutyl. Examples of $C_{1-6}$-alkyl are methyl, ethyl, propyl, isopropyl, butyl, sec-butyl, tert-butyl, isobutyl, pentyl and hexyl. Examples of $C_{5-8}$-cycloalkyl are cyclopentyl, cyclohexyl and cycloheptyl. Examples of 5- or 7-membered heterocyclic rings are morpholino, pyrrolidino and piperidino. Examples of aryl are phenyl and substituted phenyl such as tolyl. Examples of halogen are bromine and chlorine. Examples of $C_{1-4}$-alkoxy are methoxy, ethoxy, propoxy, isopropoxy, butoxy, sec-butoxy, tert-butoxy and isobutoxy. Examples of mono- or di$C_{1-4}$-alkylamino are N-methylamino, N,N-ethylmethylamino, N,N-diethylamino, N,N-dipropylamino, N-isopropylamino and N,N-dibutylamino.

Examples of monomers of formula (I) are (meth)acrylamide, N,N-dimethyl(meth)acrylamide, N,N-diethyl(meth)acrylamide, N-isopropyl(meth)acrylamide.

Preferably, $R^1$ and $R^2$ can be the same or different and are hydrogen or $C_{1-4}$-alkyl, whereby $C_{1-4}$-alkyl may be substituted with amino or mono- or di$C_{1-4}$-alkylamino, and $R^3$ and $R^4$ can be the same or different and are hydrogen, $C_{1-4}$-alkyl or NHCO$C_{1-4}$-alkyl, whereby $C_{1-4}$-alkyl may be substituted with amino or mono- or di$C_{1-4}$-alkylamino.

More preferably, $R^1$ and $R^2$ can be the same or different and are hydrogen or $C_{1-4}$-alkyl, and $R^3$ and $R^4$ can be the same or different and are hydrogen or $C_{1-4}$-alkyl.

Even more preferably, $R^1$ and $R^2$ are hydrogen, and $R^3$ and $R^4$ are the same or different and are hydrogen or $C_{1-4}$-alkyl.

Most preferably, $R^1$, $R^2$, $R^3$ and $R^4$ are hydrogen.

Any suitable other ethylenically unsaturated monomer can be used. Examples of other ethylenically unsaturated monomers are acrylic monomers, styrene monomers, vinyl monomers, maleic monomers and allyl monomers.

Examples of acrylic monomers are (meth)acrylic acid or salts thereof, (meth)acrylamide, (meth)acrylonitrile, $C_{1-6}$-alkyl (meth)acrylates such as ethyl (meth)acrylate, butyl (meth)acrylate or hexyl (meth)acrylate, 2-ethylhexyl (meth)acrylate, di($C_{1-4}$-alkylamino)-$C_{1-6}$-alkyl (meth)acrylates such as dimethylaminoethyl acrylate or diethylaminoethyl acrylate, amides formed from di($C_{1-4}$-alkylamino)$C_{1-6}$-alkylamines and (meth)acrylic acid and $C_{1-4}$-alkyl halide adducts thereof.

Examples of styrene monomers are styrene, 4-methylstyrene and 4-vinylbiphenyl. Examples of vinyl monomers are vinyl alcohol, vinyl chloride, vinylidene chloride, vinyl isobutyl ether and vinyl acetate. Examples of olefin monomers are ethylene, propylene, butadiene and isoprene and chlorinated or fluorinated derivatives thereof such as tetrafluoroethylene. Examples of maleic monomers are maleic acid, maleic anhydride and maleimide. An example of an allyl monomer is diallyldimethylammonium chloride.

Preferably, the optional other ethylenically unsaturated monomers comprise at least one monomer of formula II (II)

whereby $R^5$ and $R^6$ can be the same or different and are hydrogen, $C_{1-6}$-alkyl, $C_{5-8}$-cycloalkyl, halogen, aryl or NHCO$C_{1-4}$-alkyl, whereby $C_{1-6}$-alkyl may be substituted with amino, hydroxyl, halogen, $C_{1-4}$-alkoxy, aryl or mono- or di$C_{1-4}$-alkylamino, and M is hydrogen, ammonium, mono-, di-, tri- or tetra$C_{1-4}$-alkylammonium, alkali metal or earth alkaline metal.

Examples of mono-, di-, tri- or tetra$C_{1-4}$-alkylammonium are N-ethylammonium, N,N-diethyl-ammonium and N,N,N-tributylammonium. Examples of alkali metals are sodium, potassium and lithium. Examples of earth alkaline metals are magnesium and calcium.

Examples of monomers of formula (II) are (meth)acrylic acid, ammonium (meth)acrylate, sodium (meth)acrylate.

Preferably, $R^5$ and $R^6$ can be the same or different and are hydrogen, $C_{1-4}$-alkyl or NHCO$C_{1-4}$-alkyl, and M is hydrogen, ammonium, mono-, di-, tri- or tetra$C_{1-4}$-alkylammonium, alkali metal or earth alkaline metal.

More preferably, $R^5$ and $R^8$ are the same or different and are hydrogen or $C_{1-4}$-alkyl, and M is hydrogen, ammonium, or alkali metal. Most preferably, $R^5$ and $R^6$ are hydrogen, and M is hydrogen, ammonium, or alkali metal.

Preferably, the polymers are obtainable by polymerisation of at least one monomer of formula (I) and at least one monomer of formula (II).

Preferably the molar ratio of monomers of formula (I)/monomers of formula (II) is from 90:1 to 1:90, more preferably it is from 10:1 to 1:10, even more preferably, it is from 5:1 to 1:5, and most preferably it is from 1:1 to 1:5.

Preferably, the second rheology modifier has a weight average molecular weight of from 2,000 g/mol to 500,000 g/mol, more preferably, from 10,000 to 250,000 g/mol, most preferably from 50,000 to 150,000 g/mol.

The second rheology modifier is preferably prepared from a monomer mixture comprising at least one acrylic monomer. In particular, it is formed from a monomer mixture comprising an acidic acrylic monomer and a monomer having a hydrophobic side chain. Examples of acidic acrylic monomers are acrylic acid and methacrylic acid. Examples of monomers having a hydrophobic side chain are steareth 10 mole ethoxylate allyl ether and steareth 25 mole ethoxylate methacrylate. Preferably, the monomer mixture comprises from 10 to 90%, more preferably from 20 to 80%, most preferably from 30 to 70% by weight of the acidic acrylic monomer based on the weight of all monomers. Preferably, the monomer mixture comprises from 0.01 to 40%, more preferably from 0.01 to 30%, most preferably from 0.01 to 20% by weight of the monomer having at least one hydrophobic side chain based on the weight of all monomers. A particular preferred second rheology modifier is prepared from ethyl acrylate/methacrylic acid/steareth 10 mole ethoxylate allyl ether in a weight ratio of 50/40/10.

Also part of the second aspect of the invention is a process for preparing a coating composition which comprises the steps of (i) providing the mixture of rheology modifiers of the second aspect of the present invention, (ii) mixing the mixture of rheology modifiers of step (i) with a binder, a pigment, a carrier solvent and optional additives in order to form a coating composition.

The examples of binders, pigments, carrier solvents and optional additives given for the first aspect of the invention apply also here.

Preferably the pH of the coating composition is in the range of 6.5 to 10.5, more preferably 7 to 10, most preferably 7.5 to 9.5.

The amount of solids in the coating composition can be 20 to 95%, preferably 30 to 90%, more preferably 40 to 85%, most preferably 60 to 80%, by weight based on the weight of the composition.

The amount of pigment can be from 1 to 90%, preferably from can be 20 to 95%, preferably 30 to 90%, more preferably 40 to 85%, most preferably 60 to 80%, by weight based on the weight of the composition.

The amount of the first rheology modifier of the mixture of rheology modifiers of the second aspect of the invention can be from 0.001 to 5, preferably from 0.01 to 3, more preferably from 0.03 to 0.5 dry weight parts per 100 dry weight parts pigment.

The amount of the second rheology modifier of the mixture of rheology modifiers of the second aspect of the invention can be from 0.001 to 5, preferably from 0.01 to 3, more preferably from 0.03 to 0.5 dry weight parts per 100 dry weight parts pigment.

The amount of binder can be from 1 to 60, preferably from 3 to 30, more preferably from 5 to 15 dry weight parts per 100 dry weight parts pigment.

The amount of optional other components can be from 0 to 10, preferably from 0.5 to 4 dry weight parts per 100 dry weight parts pigment.

Also part of the second aspect of the invention is a coating composition obtainable by above process.

Another part of the second aspect of the present invention is a process for coating a substrate comprising the steps of
(i) providing the mixture of rheology modifiers of the second aspect of the present invention,
(ii) mixing the mixture of rheology modifiers of step (i) with a binder, a pigment, a carrier solvent and optional additives in order to form a coating composition, and
(iii) applying the coating composition obtained in step (ii) onto the substrate.

The examples for a substrate given for the first aspect of the invention apply accordingly to the second aspect of the invention.

Another part of the second aspect of the invention are substrates coated by the above process.

Also part of the second aspect of the present invention is the use of the rheology modifiers of the present invention for coating operations, especially for blade coating operations.

Another part of the second aspect of the present invention is a method for reducing white pitch in the production of coated paper comprising the step of coating the paper with a coating composition comprising the mixture of rheology modifiers of the second aspect of the present invention.

An advantage of the mixture of rheology modifiers of the second aspect of the present invention is that in processes for preparing paper, which involve blade coating operations and require coating compositions of higher than usual low "apparent high shear viscosity" only a reduced amount of polyvinyl alcohol is required to achieve the desired coating composition of higher than usual low "apparent high shear viscosity". Thus, when recycling paper coated with these composition, the formation of "white pitch" caused by the presence of polyvinyl alcohol in the wet end is reduced.

EXAMPLES

Example 1

Preparation of a Rheology Modifier of the First Aspect of the Invention

A 25% by weight solution of stearyl methacrylate:methacrylic acid copolymer in (3.6 g) EXXSOL™ D40 FLUID (EXXONMOBIL®, light hydrotreated petroleum distillates) is dissolved in EXXSOL™ D40 FLUID (EXXONMOBIL®, light hydrotreated petroleum distillates), a hydrocarbon solvent, (300 g) and the obtained solution is sparged with nitrogen for 30 minutes. A monomer solution is prepared by dissolving acrylamide (81 g, 1.14 mol) and a 1% by weight aqueous solution of ethylenediaminetetraacetic acid (5.4 g) in water (93.6 g) and adjusting the pH to 6.0. A 10% by weight aqueous solution of sodium hypophosphite (0.9 mL), a 2% by weight solution of 2,2'-azobis(2-amidinopropane) dihydrochloride (1.8 mL) and a 1% aqueous solution of sodium sulfite (1.8 mL) are added to the monomer solution. The thus obtained solution is added to the sparged hydrocarbon solvent and a nitrogen atmosphere is maintained. The stirrer speed is adjusted to give droplets of approximately 250 μm. A 1% by weight aqueous solution of tert-butyl hydroperoxide (0.9 mL) is added to the mixture to start the polymerization. The polymerization is allowed to exotherm. After polymerization, water is removed by distillation. After cooling the polymer beads are separated by filtration and dried to remove residual solvent at 40° C. The obtained polymer beads (100% of the monomer units derived from acrylamide) have an average diameter of 250 μm.

Comparative Example 1

Preparation of a Comparative Rheology Modifier

Polymer beads are prepared as described in example 1, except that the amount of the 10% by weight aqueous solution of sodium hypophosphite is 1.8 mL. The obtained polymer beads (100% of the monomer units derived from acrylamide) have an average diameter of 250 μm.

Comparative Example 2

Preparation of a Comparative Rheology Modifier

Polymer beads are prepared as described in example 1, except that the amount of the 10% by weight aqueous solution of sodium hypophosphite is 3.6 mL. The obtained polymer beads (100% of the monomer units derived from acrylamide) have an average diameter of 250 μm.

Example 2

Preparation of a Rheology Modifier of the First Aspect of the Invention

Polymer beads are prepared as described in example 1, except that the monomer solution is prepared by dissolving acrylamide (56.7 g, 0.8 mol), acrylic acid (18.6 g, 0.26 mol), sodium hydroxide (10.3 g) and a 1% by weight aqueous solution of ethylenediaminetetraacetic acid (5.4 g) in water (93.6 g) and adjusting the pH to 6.0. The obtained polymer beads (75% of the monomer units are derived from acrylamide and 25% from sodium acrylate) have an average diameter of 250 μm.

Example 3

Preparation of a Rheology Modifier of the First Aspect of the Invention

Polymer beads are prepared as described in example 2, except that the amount of the 10% by weight aqueous solution of sodium hypophosphite is 1.8 mL. The obtained polymer beads (75% of the monomer units are derived from acrylamide and 25% from acrylic acid) have an average diameter of 250 µm.

Comparative Example 3

Preparation of a Comparative Rheology Modifier

Polymer beads are prepared as described in example 2, except that the amount of the 10% by weight aqueous solution of sodium hypophosphite is 3.6 mL. The obtained polymer beads (75% of the monomer units are derived from acrylamide and 25% from acrylic acid) have an average diameter of 250 µm.

Example 4

Preparation of a Rheology Modifier of the First Aspect of the Invention

Polymer beads are prepared as described in example 1, except that the monomer solution is prepared by dissolving acrylamide (14.4 g, 0.2 mol), acrylic acid (44.1 g, 0.61 mol), sodium hydroxide (24.5 g) and a 1% by weight aqueous solution of ethylenediaminetetraacetic acid (5.4 g) in water (91.6 g) and adjusting the pH to 6.0. The obtained polymer beads (25% of the monomer units are derived from acrylamide and 75% from sodium acrylate) have an average diameter of 250 µm.

Example 5

Preparation of a Rheology Modifier of the First Aspect of the Invention

Polymer beads are prepared as described in example 4, except that the amount of the 10% by weight aqueous solution of sodium hypophosphite is 1.8 mL. The obtained polymer beads (25% of the monomer units are derived from acrylamide and 75% from acrylic acid) have an average diameter of 250 µm.

Example 6

Preparation of a Rheology Modifier of the First Aspect of the Invention

Polymer beads are prepared as described in example 4, except that the amount of the 10% by weight aqueous solution of sodium hypophosphite is 3.6 mL. The obtained polymer beads (25% of the monomer units are derived from acrylamide and 75% from acrylic acid) have an average diameter of 250 µm.

Determination of the Number Average Molecular Weight (Mn), the Weight Average Molecular Weight (Mw) and the Intrinsic Viscosity (IV) of the Rheology Modifiers of Examples 1 to 6, and Comparative Examples 1 to 3

The number average molecular weight (Mn), the weight average molecular weight (Mw) and the intrinsic viscosity (IV) are determined by size exclusion chromatography (detector: VISCOTEC® TDA (three detector array) (refractive index-, viscometer- and RALS) (90°/LALS) (7°) light scattering detector); column: 2×VISCOGEL® GMPWXL (size exclusion column)+precolumn; pump: VISCOTEC® VE 20002 GPC (eluent/sample module); eluent: 0.2 M sodium nitrate, 0.8 mL/min; temperature: 35° C. (columns+detectors); calibration: narrow polyethylene oxide standard).

TABLE 1

| Rheology modifier | Mn [g/mol] | Mw [g/mol] | Polydispersity (Mw/Mn) | IV [dl/g] |
|---|---|---|---|---|
| Rheology modifiers wherein 100% of the monomer units derived from acrylamide | | | | |
| example 1 | 823,000 | 1,290,000 | 1.57 | 3.11 |
| comp. example 1 | 365,000 | 813,000 | 2.22 | 2.45 |
| comp. example 2 | 226,000 | 596,000 | 2.64 | 1.71 |
| Rheology modifiers wherein 75% of the monomer units are derived from acrylamide and 25% from sodium acrylate | | | | |
| example 2 | 1,417,000 | 2,002,000 | 1.41 | 3.90 |
| example 3 | 680,000 | 1,113,000 | 1.63 | 3.20 |
| comp. example 3 | 324,000 | 657,000 | 2.03 | 2.49 |
| Rheology modifiers wherein 25% of the monomer units are derived from acrylamide and 75% from sodium acrylate | | | | |
| example 4 | 1,741,000 | 2,551,000 | 1.47 | 5.78 |
| example 5 | 1,689,000 | 2,134,000 | 1.26 | 4.38 |
| example 6 | 873,000 | 1,238,000 | 1.42 | 4.16 |

Determination of the "Low Shear Viscosity" of Aqueous Solutions of the Rheology Modifiers of Examples 1 to 6, and Comparative Examples 1 to 3

The "low shear viscosity" of aqueous solutions of polymer beads at 30 g, 60 g and 90 g, respectively, beads per liter water is measured using a BROOKFIELD° viscometer (100 rpm and 25° C.).

Figure 1:
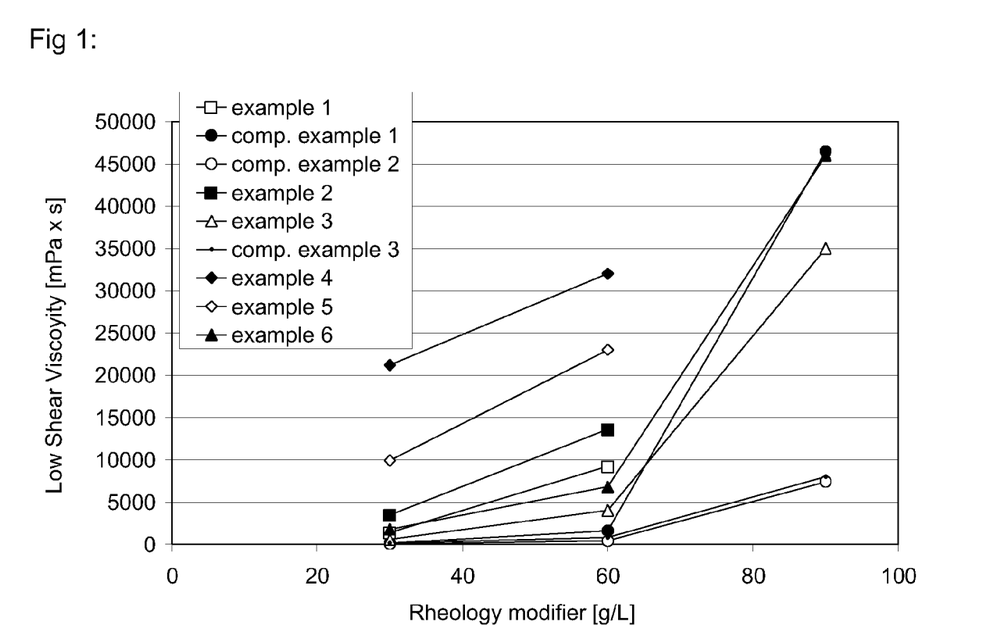
FIG. 1 shows "low shear viscosities" of aqueous solutions of the rheology modifiers of the first aspect of the present invention and of comparative rheology modifiers at 30 g/l, 60 g/L and 90 g/L of rheology modifier.

The results are shown in FIG. 1.

One can see that the rheology modifiers of examples 1 to 6 show "low shear viscosities", which are comparable to the "low shear viscosities" of the rheology modifiers obtained in comparative examples 1 to 3.

Determination of the "Apparent Extensional Viscosity" of Aqueous Solutions of the Rheology Modifiers of Examples 1 to 6, and Comparative Examples 1 to 3

The "normalized diameter" of aqueous solutions of the polymer beads at 30 g beads per liter water is measured using a CaBER™ 1 instrument (extensional rheometer), which is an extensional rheometer sold by Thermo Haake (plates diameter 6 mm; start height 2.5 mm; end height 7.85 mm; hencky strain 1.14). The normalized diameter is the filament diameter (as a function of time)/initial filament diameter. The break-up time, i.e. the time at which the normalized diameter is 0, is related to the apparent extensional viscosity. The higher the break-up time, the higher is the "apparent extensional viscosity".

Figure 2:
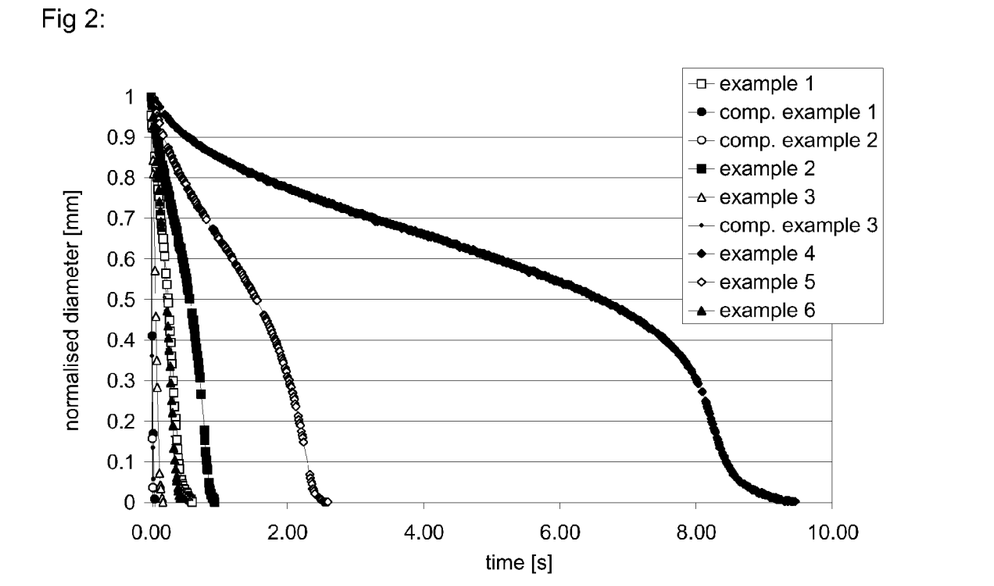
FIGS. 2 and 3 show "apparent extensional viscosities" of aqueous solutions of the rheology modifiers of the first aspect of the present invention and of comparative rheology modifiers at 30 g/L rheology modifier.
Figure 3:
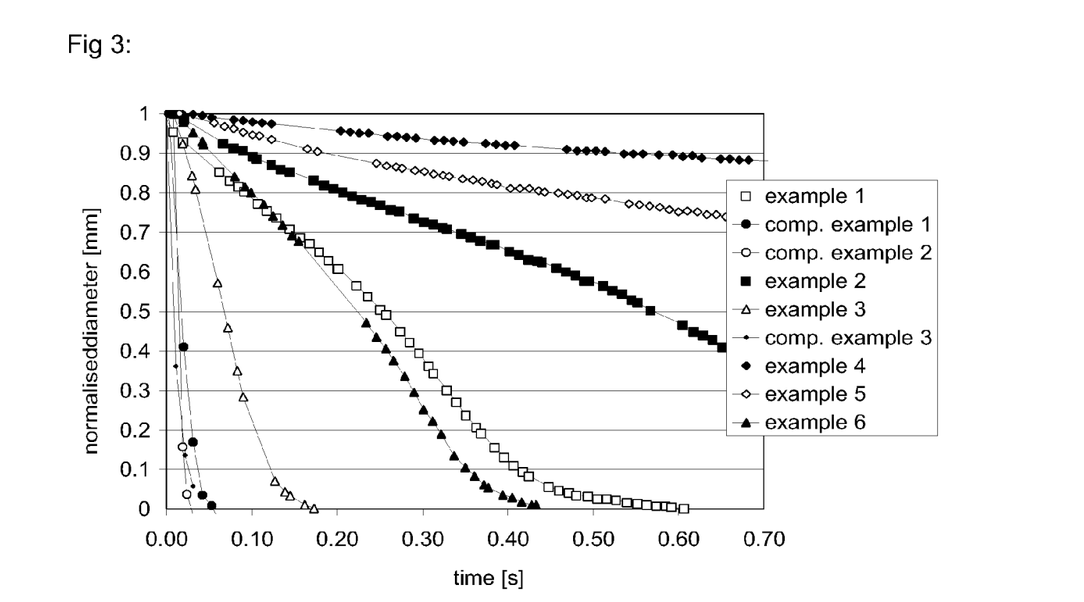

The results are shown in FIGS. 2 and 3.

One can see that the rheology modifiers of examples 1 to 6 show "apparent extensional viscosities", which are considerable higher than the "apparent extensional viscosities" of the rheology modifiers obtained in comparative examples 1 to 3. Among the rheology modifiers of examples 1 to 6, the rheology modifiers of examples 2, 4 and 5 yield the highest "apparent extensional viscosities". The highest "apparent extensional viscosity" is obtained with the rheology modifier of example 4.

Example 7

Preparation of Coating Compositions, Suitable for Curtain Coating Operations, Containing the Rheology Modifiers of Examples 1 to 6

The rheology modifiers obtained in examples 1 to 6 are dissolved in water at 30 g beads per liter of water, and varying amounts (0.5 to 0.2 dry weight parts of polymer beads) of these solutions are added to a mixture of 100 dry weight parts ground calcium carbonate, and 17.5 dry weight parts of CIBA® LATEXIA® 301 (styrene butadiene latex) in water to give a coating composition having a solid content of 60% by weight based on the weight of the composition. The pH is adjusted to 9.0.

Comparative Example 4

Preparation of a Coating Composition, Suitable for Curtain Coating Operations, Containing STEROCOLL® BL (Acrylamide/Acrylic Acid Copolymers Having a Mw of about 10,000,000) as Rheology Modifier 0.1 dry weight parts STEROCOLL® BL (acrylamide/acrylic acid copolymers having a Mw of about 10,000,000), an inverse (water-in-oil) emulsion of a rheology modifier, is added to a mixture of 100 dry weight parts ground calcium carbonate, and 17.5 dry weight parts DL 936, a styrene butadiene latex, in water to give a coating composition having a solid content of 60% by weight based on the weight of the composition. The pH is adjusted to 9.0.

Comparative Example 5

Preparation of a Coating Composition Suitable for Curtain Coating Operations, Containing STEROCOLL® BL (Acrylamide/Acrylic Acid Copolymers Having a Mw of about 10,000,000) as Rheology Modifier 0.1 dry weight parts STEROCOLL® BL (acrylamide/acrylic acid copolymers having a Mw of about 10,000,000), an inverse (water-in-oil) emulsion of a rheology modifier, is added to a mixture of 100 dry weight parts ground calcium carbonate, and 17.5 dry weight parts of CIBA® LATEXIA® 301 (styrene butadiene latex) in water to give a coating composition having a solid content of 60% by weight based on the weight of the composition. The pH is adjusted to 9.0.

Determination of "Low Shear Viscosity" of the Coating Compositions of Example 7 and Comparative Examples 4 and 5

The low shear viscosities of the coating compositions are measured using a Brookfield viscometer (100 rpm and 25° C.).

TABLE 2

| Coating composition | Rheology modifier | Low Shear Viscosity [mPa × s] Amount Rheology modifier [dry weight parts/100 dry weight parts calcium carbonate] | | | | |
|---|---|---|---|---|---|---|
| | | 0.04 | 0.06 | 0.08 | 0.1 | 0.2 |
| example 7 | example 1 | 76 | | 86 | | 128 |
| | example 2 | 102 | | 126 | | 250 |
| | example 3 | 98 | | 118 | | 212 |
| | example 4 | 134 | 164 | 188 | | |
| | example 5 | 132 | 156 | 188 | | |
| | example 6 | 124 | 136 | 160 | | |
| comp. example 4 | Sterocoll ® BL | | | | 152 | |
| comp. example 5 | Sterocoll ® BL | | | | 164 | |

One can see that "low shear viscosities" comparable to those of the coating compositions containing STEROCOLL® BL (acrylamide/acrylic acid copolymers having a Mw of about 10,000,000) (comparative examples 4 and 5) can be achieved with the coating compositions of example 7 containing the rheology modifiers of examples 1 to 6. The rheology modifiers of examples 4, 5 or 6 even yield coating compositions of comparable "low shear viscosities" at lower dosages compared to STEROCOLL® BL (acrylamide/acrylic acid copolymers having a Mw of about 10,000,000).

Determination of Water Retention Properties of the Coating Compositions of Example 7 and Comparative Examples 4 and 5 Using Paper as Substrate Water retention properties (g released water/m² base paper) of the coating compositions are measured following test method TAPPI T 701 pm-01 using an AA GWR water retention meter by determining the amount of continuous phase removed through a membrane filter (non-hydroscopic polycarbonate filter with 5 µm mean pore size) from the coating into base paper (chromatography paper with basis weight 413 g/m²) within 2 minutes and under hydrostatic pressure of 2 bars.

The measurement is performed on those coating compositions of example 7 having comparable "low shear viscosities" to the coating composition of comparative example 5.

TABLE 3

| Coating composition. | Rheology modifier | Amount Rheology modifier [dry weight parts/100 dry weight parts calcium carbonate] | Water loss [g/m²] |
|---|---|---|---|
| example 7 | example 1 | 0.2 | 203 |
| | example 2 | 0.08 | 224 |
| | example 3 | 0.08 | 231 |
| | example 4 | 0.06 | 200 |
| | example 5 | 0.06 | 207 |
| | example 6 | 0.08 | 207 |
| Comp. example 5 | STEROCOLL ® BL | 0.1 | 191 |

The lower the "water loss" value, the higher is the water retention. One can see that the water retention properties of the coating compositions of example 7 containing the rheology modifiers of examples 1 to 6, are comparable to those of the coating composition containing STEROCOLL® BL (acrylamide/acrylic acid copolymers having a Mw of about 10,000,000) (comparative example 5). Among the rheology modifiers of examples 1 to 6, the rheology modifier of example 4 yields the best water retention properties.

It was not possible to measure the apparent extensional viscosities of the coating compositions due to irreproducible results.

Example 8

Preparation of a Second Rheology Modifier of the Mixture of Rheology Modifiers of the Second Aspect of the Invention An aqueous emulsion polymer composed of ethyl acrylate/methacrylic acid/steareth 10 mole ethoxylate allyl ether in a weight ratio of 50/40/10 is prepared in analogy to example 1 of WO 04/076743.

Examples 9 to 12

Preparation of Coating Compositions, Suitable for Blade Coating Operations, Containing a Mixture of the Rheology Modifiers of Example 1 or 2 and the Rheology Modifier of Example 8 as Second Rheology Modifier Following coating compositions having a pH of 9.0 and various solid contents (68.0 to 69.6% by weight) are prepared.

TABLE 5

| | Amount of Ingredients [dry weight parts] Example No | | | |
|---|---|---|---|---|
| Ingredients | 9 | 10 | 11 | 12 |
| Calcium carbonate | 100 | 100 | 100 | 100 |
| Polyvinyl alcohol 4/98 | 0.6 | 0.6 | 0.6 | 0.6 |
| CIBA ® LATEXIA ® 204 | 7.5 | 7.5 | 7.5 | 7.5 |
| CIBA ® RAISACOAT ® CAS50 | 0.5 | 0.5 | 0.5 | 0.5 |
| CIBA ® TINOPAL ® ABPZ liq | 0.5 | 0.5 | 0.5 | 0.5 |
| Rheology modifier example 1 | 0.1 | 0.08 | | |
| Rheology modifier example 2 | | | 0.08 | 0.06 |
| Rheology modifier example 8 | 0.06 | 0.08 | 0.05 | 0.06 |

CIBA ® LATEXIA ® 204 is a styrene acrylate latex, CIBA ® RAISACOAT ® CAS50 is a calcium stearate dispersion, CIBA ® TINOPAL ® ABPZ liq is diaminostilbenetetrasulfonic acid.

Determination of "Apparent High Shear Viscosities of the Coating Compositions of Examples 9 to 12

The "apparent high shear viscosities" of the coating compositions having a solid content of 68.5% by weight are measured using an ACAV A4 viscometer.

Figure 4:
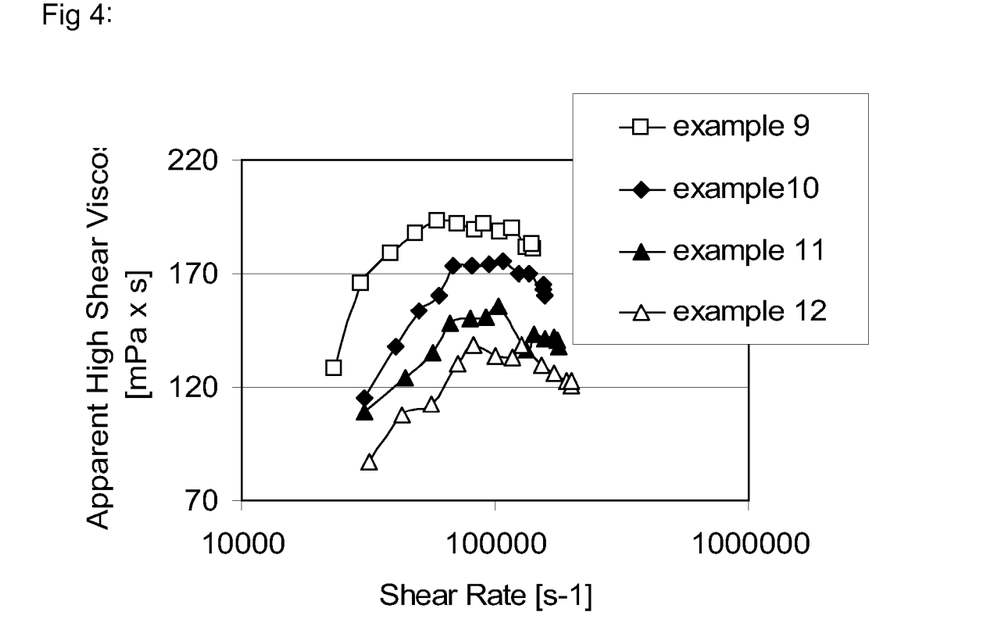
FIG. 4 shows the "apparent high shear viscosities" at different shear rates of coating compositions, suitable for processes of preparing coated paper, which involve blade coating operations and require coating composition of higher than usual low "apparent high shear viscosity", containing a mixture of rheology modifiers of the second aspect of the present invention.

The "apparent high shear viscosities" are shown in FIG. 4.

The coating compositions of examples 9 to 11 containing the rheology modifiers of examples 1 or 2 and the rheology modifier of example 7 as second rheology modifier and only 0.6 dry weight parts of polyvinyl alcohol, yield higher than usual "apparent high shear viscosities". A particular higher than usual "apparent high shear viscosity" is obtained with the coating composition of example 9 containing 0.1 dry weight parts of the rheology modifier of example 1 and 0.06 dry weight parts of the rheology modifier of example 8 as additional rheology modifier, followed by the coating composition of example 10.

Determination of the Water Retention Properties of Coating Compositions of Examples 9 to 12

The water retention properties are determined as described for the coating compositions of example 7 and comparative examples 4 and 5.

Figure 5:
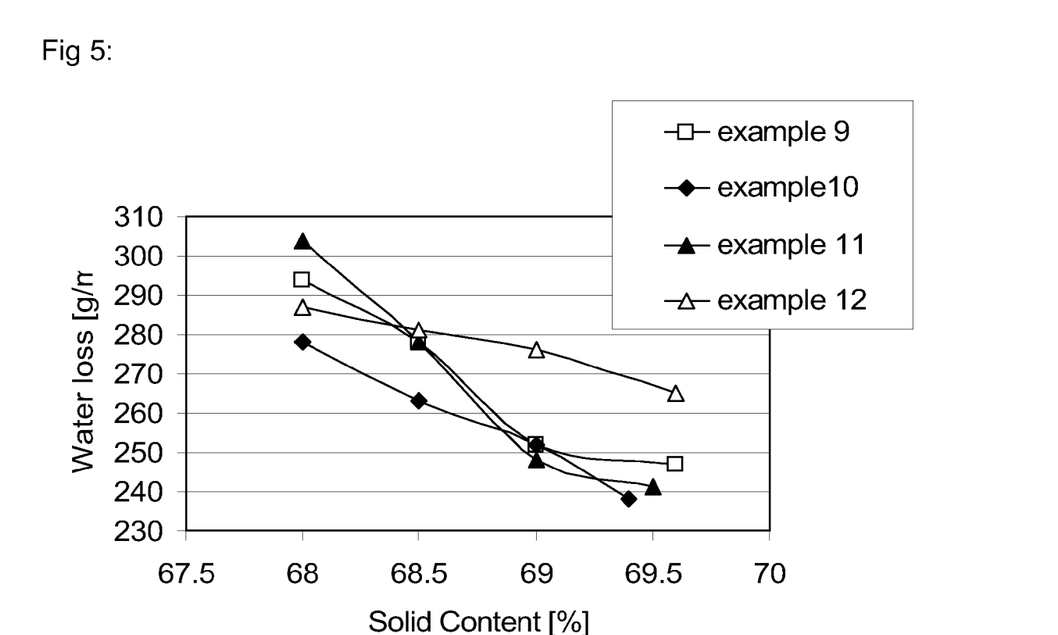
FIG. 5 shows the "water retention properties" at different solid contents of coating compositions, suitable for processes for preparing coated paper, which involve blade coating operations and require coating composition of higher than usual low "apparent high shear viscosity, containing a mixture of rheology modifiers of the second aspect of the present invention.

The water retention properties are shown in FIG. 5.

The invention claimed is:

1. A rheology modifier, which is a water-soluble polymer having a weight average molecular weight (Mw) of at least 1,000,000 g/mol and an intrinsic viscosity of at least 2.5 dl/g, both as determined by size exclusion chromatography, and wherein the water-soluble polymer is in the form of solid particles,
wherein the solid particles are beads having a diameter from 100 μm to 400 μm.

2. The rheology modifier of claim 1, wherein the water-soluble polymer is composed of monomer units derived from
(i) at least one monomer of formula I whereby
$R^1$ and $R^2$ can be the same or different and are hydrogen, $C_{1-6}$-alkyl or $C_{5-8}$-cycloalkyl,
or
$R^1$ and $R^2$ can together with the nitrogen to which they are attached form a hetero-cyclic 5- or 6-membered ring, whereby $C_{1-6}$-alkyl may be substituted with amino, hydroxyl, halogen, $C_{1-4}$-alkoxy, aryl or mono- or di-$C_{1-4}$-alkylamino, and
$R^3$ and $R^4$ can be the same or different and are hydrogen, $C_{1-6}$-alkyl, $C_{5-8}$-cycloalkyl, halogen, aryl or NHCOC$_{1-4}$-alkyl, whereby $C_{1-6}$-alkyl may be substituted with amino, hydroxyl, halogen, $C_{1-4}$-alkoxy, aryl or mono- or di$C_{1-4}$-alkylamino, and
(ii) optional other ethylenically unsaturated monomers.

3. The rheology modifier of claim 2, wherein the optional other ethylenically unsaturated monomers comprise at least one monomer of formula II whereby
$R^5$ and $R^6$ can be the same or different and are hydrogen, $C_{1-6}$-alkyl, $C_{5-8}$-cycloalkyl, halogen, aryl or NHCOC$_{1-4}$-alkyl, whereby $C_{1-6}$-alkyl may be substituted with amino, hydroxyl, halogen, $C_{1-4}$-alkoxy, aryl or mono- or di-$C_{1-4}$-alkylamino, and M is hydrogen, ammonium, mono-, di-, tri- or tetra-$C_{1-4}$-alkylammonium, alkali metal or earth alkaline metal.

* * * * *